United States Patent [19]
Alberter et al.

[11] Patent Number: 4,954,677
[45] Date of Patent: Sep. 4, 1990

[54] TIRE PRESSURE SENSOR FOR MOTOR VEHICLES

[75] Inventors: Günther Alberter, Nuremberg; Helmut Deeg, Zirndorf; Gerhard Hettich, Dietenhofen; Klaus Neidhard, Wendelstein; Hans-Dieter Schmid, Nuremberg; Hans Schrumpf, Oberasbach, all of Fed. Rep. of Germany

[73] Assignee: Robert Bosch GmbH, Stuttgart, Fed. Rep. of Germany

[21] Appl. No.: 347,775

[22] PCT Filed: Aug. 4, 1987

[86] PCT No.: PCT/DE87/00341
§ 371 Date: Apr. 21, 1989
§ 102(e) Date: Apr. 21, 1989

[87] PCT Pub. No.: WO88/03879
PCT Pub. Date: Jun. 2, 1988

[30] Foreign Application Priority Data
Nov. 20, 1986 [DE] Fed. Rep. of Germany ....... 3639688

[51] Int. Cl.[5] .............................................. H01H 35/32
[52] U.S. Cl. ..................................... 200/834; 73/146.5; 116/34 R; 200/61.25; 200/83 D; 340/442
[58] Field of Search ................. 307/118; 116/34 R X; 340/611, 626, 442 X; 73/723, 729, 146.3, 146.4, 146.5 X, 146.8; 200/61.22, 61.25, 83 R, 83 A, 83 C, 83 N, 83 S, 81 R, 83 Y, 83 D, 83 J, 83 SA, 81.4, 81.5

[56] References Cited
U.S. PATENT DOCUMENTS

| | | | |
|---|---|---|---|
| 3,809,835 | 5/1974 | Watt | 200/83 P |
| 3,908,105 | 9/1975 | Schuler | 200/835 |
| 4,335,283 | 6/1982 | Migrin | 200/61.25 |
| 4,386,247 | 5/1983 | Covat | 200/61.25 |
| 4,435,625 | 3/1984 | Buchschmid | 200/61.22 |
| 4,783,993 | 11/1988 | Lothar | 73/146.5 |
| 4,793,277 | 12/1988 | Haas | 200/61.25 |

FOREIGN PATENT DOCUMENTS

| | | |
|---|---|---|
| 0020809 | 7/1979 | European Pat. Off. . |
| 2827447 | 7/1978 | Fed. Rep. of Germany . |
| 3310052 | 3/1983 | Fed. Rep. of Germany . |

Primary Examiner—Gerald P. Tolin
Attorney, Agent, or Firm—Michael J. Striker

[57] ABSTRACT

A tire pressure sensor to be fastened to a rim of a vehicle wheel for sensing an inflation pressure of a tire mounted on the rim, the tire pressure sensor comprising a reference pressure chamber having a gas filled reference pressure volume, an electrically conductive diaphragm for sealingly separating the reference pressure chamber at a tire interior, a sensor electric circuit, a contact pin located in the reference pressure chamber and cooperating with the electrically inductive diaphragm for closing the sensor electric circuit when the tire inflation pressure is at a predetermined value, and an additional pressure chamber communicating with the reference pressure chamber and deformable to change the reference pressure volume therein to thereby establish a predetermined reference pressure in the reference pressure chamber.

12 Claims, 2 Drawing Sheets

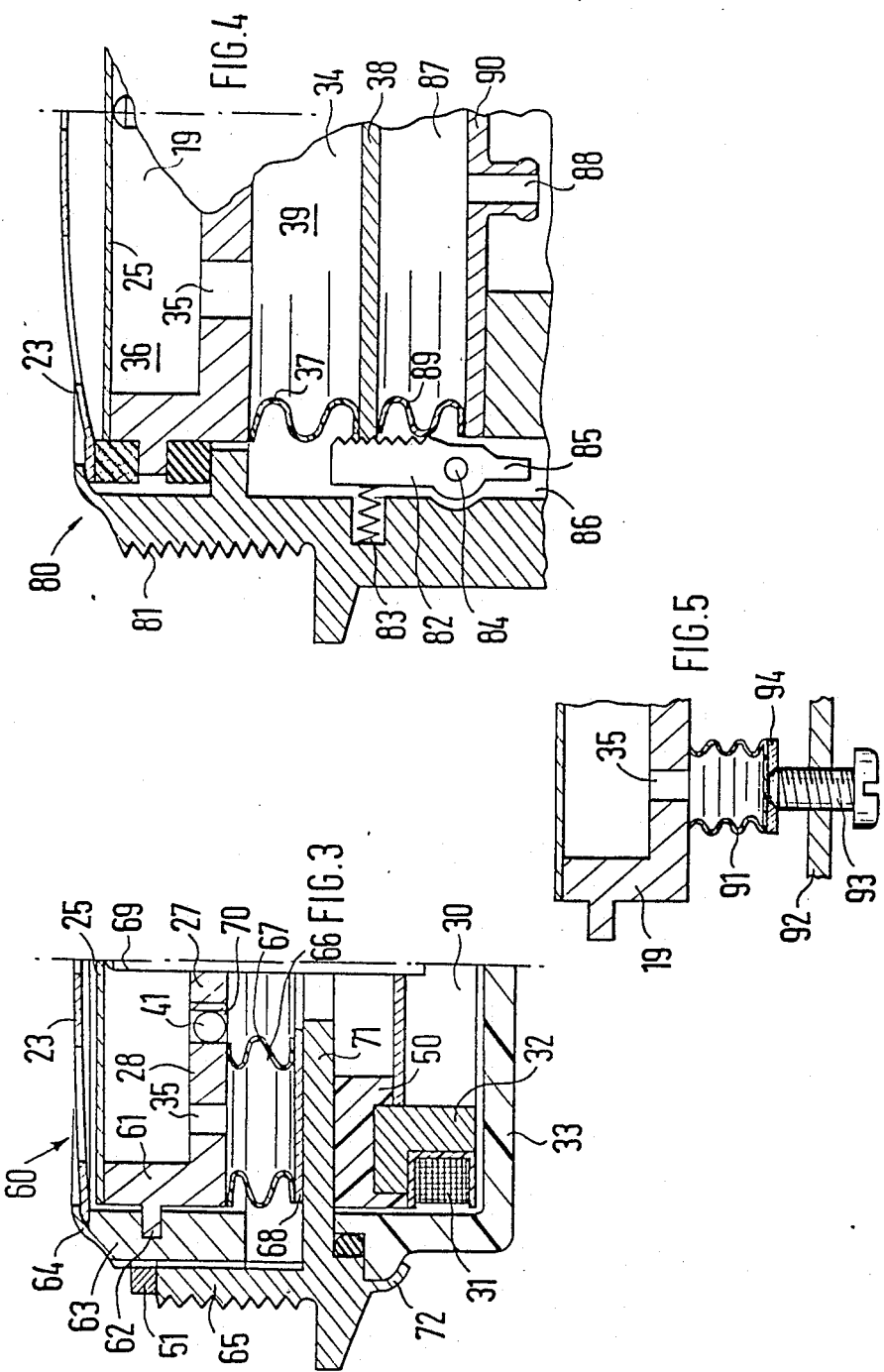

TIRE PRESSURE SENSOR FOR MOTOR VEHICLES

BACKGROUND OF THE INVENTION

The invention relates to a tire pressure sensor for motor vehicles.

It is known from DE-OS No. 28 32 447 to screw in a tire pressure sensor at the circumference of a wheel rim for monitoring the inflation pressure in the tire, which tire pressure sensor comprises a pressure switch which is to be actuated by the tire pressure. The pressure switch comprises, on one hand, an electrically conductive diaphragm which closes a reference pressure chamber in the direction of the tire and, on the other hand, a contact pin which is sealed in a glass bushing in the reference pressure chamber so as to be electrically insulated. The middle area of the diaphragm contacts the contact pin so as to close an electric circuit when there is sufficient inflation pressure in the tire. The reference pressure chamber is filled via a duct with air or nitrogen to a desired reference pressure and is then sealed so as to be tight against pressure. The reference pressure is selected in such a way that the diaphragm contacts the end of the contact pin when there is sufficient inflation pressure in the tire. However, if the inflation pressure in the tire falls below a minimum pressure predetermined by the reference pressure the diaphragm is lifted from the contact pin and opens a resonant circuit which comprises a coil and a capacitor and is arranged in the tire pressure sensor. It can be determined whether or not the pressure switch is closed by a signal receiver arranged in the vicinity of the wheel, every time the tire pressure sensor runs past at every revolution of the wheel via a high-frequency oscillation of the evaluating circuit which is fixedly arranged in the vehicle.

Such known constructions have the disadvantage that the reference pressure chamber is filled with the gas during the manufacturing of the tire pressure sensor, the sensor is adjusted to a predetermined reference pressure, and the reference pressure chamber is then welded so as to be gastight, so that it is no longer possible to subsequently adapt the reference pressure to different values which are predetermined by the type of vehicle, by the tire, the speed or the loading of the vehicle. Therefore, a quantity of pressure sensors with different tire pressures must be produced and kept in storage.

In another solution known from DE-PS No. 33 10 052, the reference pressure in the reference pressure chamber of the tire pressure sensor is adjustable in a variable manner in that the tire pressure is fixed simultaneously as new reference pressure for the reference pressure chamber via a valve arrangement during the tire filling process. However, this has the disadvantage that the valve arrangement does not ensure the sealing of the reference pressure chamber necessary for the life of the tire pressure sensor so that, in the event of a leaky valve, air escapes from the reference pressure chamber when a difference in pressure occurs between the reference pressure chamber and the tire, which defect is not noticed. An insufficient tire pressure during a gradual drop in pressure in the tire is then no longer indicated.

SUMMARY OF THE INVENTION

The object of the present invention is to develop a tire pressure sensor with a reference volume which is sealed in a gastight manner in such a way that it can be adjusted in a fixed manner to different reference pressures. The object of the invention is achieved by a tire pressure sensor in which the entire gas filled reference volume can be changed to adjust to a desired reference pressure.

The design of the tire pressure sensor, according to the invention, has the advantage that only one single construction of the tire pressure sensor is necessary for the different desired reference pressures, so that expenditure on manufacturing and storage can be considerably reduced. The pressure in the reference pressure chamber can now be calibrated to the desired value relating to the specific vehicle prior to the installation of the reference pressure sensor at the vehicle wheel. A further advantage consists in that the filling opening is closed so as to be tight against pressure after the reference pressure chamber is filled with gas, so that the subsequently adjusted reference pressure is retained unchanged thereafter.

It is particularly advantageous that the reference pressure chamber communicates with an additional sealed pressure chamber arranged in the housing of the tire pressure sensor via at least one opening; the volume of the additional pressure chamber can be changed by means of deformation for the purpose of adjusting the desired reference pressure. In addition, it is possible, in principle, to adjust the desired reference pressure starting from a low pressure in the reference chamber by contracting the additional pressure chamber, as well as to achieve this reference pressure starting from a higher pressure by expanding the additional pressure chamber. It is particularly advisable that the additional pressure chamber be arranged on the front side of the reference pressure chamber facing away from the diaphragm and that it consist of a bellows which can be contracted in the axial direction of the reference pressure chamber. In an advantageous manner, the bellows contacts the front side of the reference pressure chamber provided with the opening with one end and contacts a closing plate with the other end, wherein the reference pressure chamber and closing plate are axially displaceable relative to one another in the housing of the tire pressure sensor.

The present invention as to its construction so to its mode of operation, together with additional objects and advantages thereof, will be best understood from the following detailed description of the preferred embodiments with reference to accompanying drawings.

BRIEF DESCRIPTION OF THE DRAWINGS

FIG. 3 shows a second embodiment of the tire pressure sensor according to the invention, in enlarged scale; FIG. 4 shows a partial cross-sectional view of yet another embodiment of the tire pressure sensor according to the invention with an additional pressure chamber; and FIG. 5 shows a partial cross-sectional view of a further embodiment of the tire pressure sensor according to the invention with an adjusting screw for the reference pressure.

DESCRIPTION OF THE PREFERRED EMBODIMENTS

Figure 1:
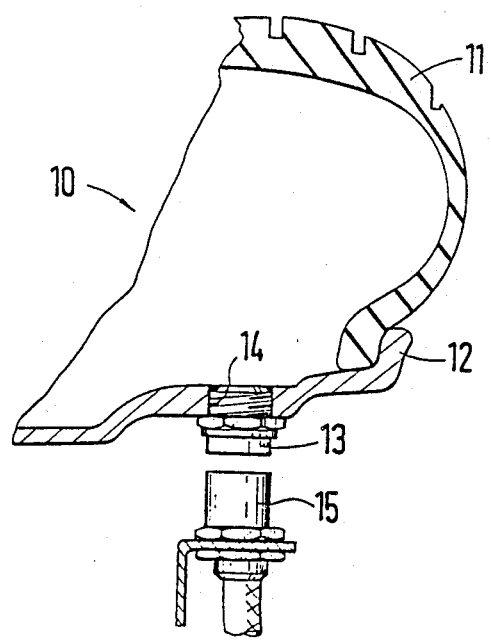
FIG. 1 shows a partial cross-sectional view of a vehicle wheel with a tire pressure sensor according to the invention, which is inserted in the wheel rim.

In FIG. 1, a portion of a motor vehicle wheel is shown in a reduced scale in cross section and designated by 10. It shows a tire 11 which is mounted on a wheel rim 12. A tire pressure sensor 13 is screwed into a threaded hole 14 of the wheel rim 12 at an inwardly directed portion of the wheel rim 12. At a slight distance from the latter, a signal receiver 15 is fastened in the area of the tire pressure sensor 13 at the wheel suspension of the vehicle, not shown, the front side of the signal receiver 15 being directed toward the tire pressure sensor 13, and senses a high-frequency oscillation in the tire pressure sensor 13 when the latter passes by during every revolution of the vehicle wheel 10.

Figure 2:
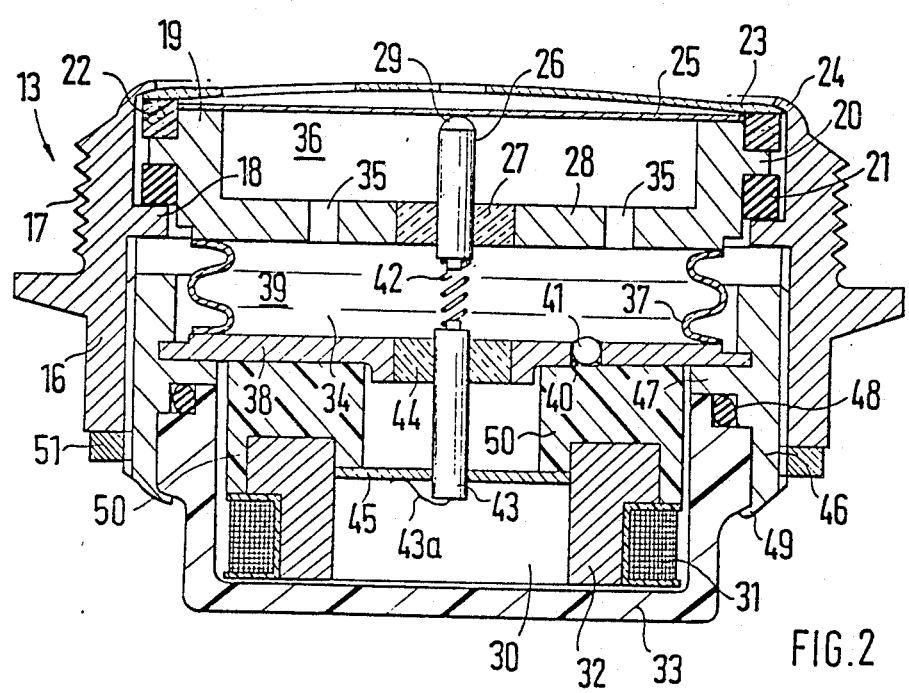
FIG. 2 shows a cross-view of a partial cross-sectional view of first embodiment of the tire pressure sensor, according to the invention, in enlarged scale.

The construction of such a tire pressure sensor 13 is shown in FIG. 2. It consists of a sensor housing 16 of noble metal which comprises a threaded shoulder 17 for fastening at the wheel rim 12. The sensor housing 16 is open in the front in the direction of the tire 11. An annular shoulder 18 is located on the inside in the middle area of the sensor housing 16. A reference pressure chamber 19 made of steel comprising a collar 20 which is directed radially outward is inserted into the sensor housing 16 from the front and is supported at the annular shoulder 18 of the sensor housing 16 via a sealing ring 21. The reference pressure chamber 19 carries a spacer ring 22 of fibrous plastics material at its collar 20. Above this, a perforated cover disk 23 is inserted into the opening of the sensor housing 16, and these parts are clamped in the sensor housing 16 by a flanged rim 24 at the front side of the sensor housing 16. The reference pressure chamber 19 is closed in the direction of the tire interior 11 by a flat steel diaphragm 25. In the center of the reference pressure chamber 19, a contact pin 26 with a glass bushing 27 is fastened at the base 28 of the reference pressure chamber so as to be tight against pressure and electrically insulated. At its front end, the contact pin 26 carries a contact tip 29 which, together with the diaphragm 25, forms a pressure switch which is actuated as a function of the pressure differential on the two sides of the diaphragm 25.

A resonant circuit chamber 30 is located in the lower area of the sensor housing 16, a toroidal coil 31 on a ferrite core 32 which is connected to a series resonant circuit, and a capacitor, not shown, are arranged in the resonant circuit chamber 30. These parts are received in a cover cap 33 consisting of plastic.

An additional pressure chamber 34, which communicates with the pressure space 36 of the reference pressure chamber 19 via two openings 35 in the base 28 of the reference pressure chamber 19, is arranged between the reference pressure chamber 19 and the resonant circuit chamber 30 on the front side of the reference pressure chamber 19 facing away from the diaphragm 25. This additional pressure chamber 34 comprises a bellows 37 which can be contracted in the axial direction of the reference pressure chamber 19. The bellows 37 contacts the front side of the reference pressure chamber 19 with its upper end and contacts the closing plate 38 with its other end so as to be gastight, wherein the openings 35 in the base 28 of the reference pressure chamber 19 are enclosed by the bellows 37. The pressure space 36 of the reference pressure chamber 19 constantly communicates with the pressure space 39 of the additional pressure chamber 34 via the openings 35. They form a reference volume which is filled with a reference gas, e.g. nitrogen, prior to the insertion of the reference pressure chamber 19 with pressure chamber 34 into the sensor housing 16 via a filling opening 40 in the closing plate 38. The pressure of the gas in the reference volume is selected in such a way that it lies below the subsequently desired reference pressure. The filling opening 40 is then closed so as to be tight against pressure by a steel ball 41 which is pressed into the filling opening 40 and welded. The contact pin 26 is electrically connected with a connection pin 43 by its lower end via a helical spring 42, the connection pin 43 being fastened in a glass bushing 44 in the closing plate 38 so as to be electrically insulated and tight against pressure. The free end of this connection pin 43 is connected with the resonant circuit in the resonant circuit chamber 30 via a flexible wire 43a at a connection plate 45.

In order to be able to adjust the desired reference pressure in the reference pressure chamber 19, it is provided to change the reference volume by deforming the additional pressure chamber 34 in that the bellows 37 is pressed together axially. For this purpose, a clamping ring 46 is provided which carries the closing plate 38 of the additional pressure chamber 34 with a support 47, which projects inward in a ring-shaped manner, and is inserted, preferably pressed into the sensor housing 16 from below. In addition, the cover cap 33 is sealed relative to the clamping ring 46 by a sealing ring 48 and is clamped by a flanged rim 49 of the clamping ring 46. A carrying member 50 consisting of plastic for the ferrite core 32 and the toroidal coil 31 is supported at the back of the closing plate 38.

During the production of the tire pressure sensor 13, the clamping ring 46 is pressed approximately halfway into the sensor housing 16 after the pressure spaces 36, 39 of the reference pressure chamber 19 and the additional pressure chamber 34 are filled with the gas and after the filling opening 40 is sealed. The desired reference pressure must be determined with regard to the specific vehicle prior to the final installation of the tire pressure sensor 13 in the wheel rim 12 and this reference pressure is now applied to the diaphragm 25 from the outside, e.g. in a pressure device suitable for this purpose. The clamping ring 46 is now pressed into the sensor housing 16 from the rear by a corresponding tool until the reference pressure is increased enough so that the diaphragm 25 is lifted from the contact tip 29 by reducing the reference volume by the closing plate 38 which is axially displaceable relative to the reference pressure chamber 19 via the annular support 47. At this point in time, the pressure differential on the two sides of the diaphragm 25 is equal to zero, i.e. the desired reference pressure is now adjusted in the reference pressure chamber 19. The lifting of the diaphragm 25 from the contact tip 29 can be detected by means of an oscillation which is coupled at the toroidal coil 31 of the resonant circuit chamber 30. The clamping ring 46 is now fixed in this position by a counter-nut 5 at the sensor housing 16. A permanent deformation of the bellows 37 and change in the reference volume is accordingly effected for the purpose of calibrating the tire pressure sensor 13 to the desired reference pressure.

In the construction according to FIG. 2, the desired reference pressure can also be adjusted from the outside after inserting the tire pressure sensor 13 at the wheel rim 12 in that the desired reference pressure is first produced in the tire, and the reference volume is then reduced by the axial contraction of the additional pressure chamber 34 via the clamping ring 46 until the diaphragm 25 is lifted from the contact pin 26 at the desired reference pressure. If necessary, the clamping ring can also be screwed into the sensor housing 16 by a thread in order to adjust the reference pressure and subsequently secured. In such a construction, it is also possible to change the reference pressure at a later time in that the securing means is first removed in order to carry out a new calibration of the reference pressure by screwing or unscrewing the clamping ring 46 at the sensor housing 16.

The adjustment of the desired reference pressure can be realized in different ways to the extent that the reference pressure chamber 19 and the closing plate 38 of the additional pressure chamber 34 in the sensor housing are axially displaceable relative to one another by a clamping ring or the like. Accordingly, the construction can also be selected in such a way that the clamping ring is inserted at the opening of the sensor housing 16 directed toward the tire.

The embodiment according to FIG. 3 shows such an arrangement, wherein only the right half of the tire pressure sensor 60 is shown in cross section in enlarged scale because of the symmetrical construction. In this instance, a reference pressure chamber 61 is received in a clamping ring 63 by its outwardly directed collar 62, which clamping ring 63 holds the cover disk 23 in the front by a flanged rim 64 for protecting the diaphragm 25 and is inserted in the sensor housing 65 from above. An annular additional pressure chamber 66 is arranged at the back side of the reference pressure chamber 61 and consists of a bellows 67 which is arranged annularly around the contact pin 69 projecting out of the reference pressure chamber 61 so as to be tight against pressure, the bellows 67 being supported against the reference pressure chamber 61 on the one side and against a correspondingly annular closing plate 68 on the other side. Accordingly, it is possible to guide the contact pin 69 of the reference pressure chamber 61 in one piece up to the resonant circuit chamber 30 via the glass bushing 27. Moreover, the filling opening 70 for the reference gas in the base 28 of the reference pressure chamber 61 can be arranged directly next to the glass bushing 27 without being covered by the annular pressure chamber 66. The reference pressure chamber 61 and annular pressure chamber 66 also communicate with one another in this instance via the openings 35 in the base 28 of the reference pressure chamber 61. The annular closing plate 68 lies on an annular shoulder 71 of the sensor housing 65 which extends very far inward. The resonant circuit chamber 30, with its toroidal coil 31, the ferrite core 32, the carrying member 50 and the capacitor, not shown, lie below the latter. The cover cap 33 is grasped by a flanged rim 72 of the sensor housing 65.

During the production of the tire pressure sensor 60, a prefabricated unit comprising the clamping ring 63, reference pressure chamber 61, cover disk 23 and annular pressure chamber 66, is first inserted from the top into the opening of the sensor housing 65, wherein the clamping ring 63 is inserted into the sensor housing 65 approximately halfway. The reference pressure chamber 61 and the annular pressure chamber 66 are filled with gas via the filling opening 70 to a low limiting value of the various reference pressures, and the filling opening 70 is then closed so as to be tight against pressure by with the ball 41. Next, the resonant circuit chamber 30 is arranged at the back side of the annular shoulder 71 and fastened there by the flanged rim 72 of the sensor housing 65. Prior to the installation of the tire pressure sensor 60, the reference pressure can now be increased to the desired value by the continued pressing in of the clamping ring 63 by the reference pressure chamber 61 which is axially displaceable with the clamping ring 63 relative to the cover plate 38, which cover plate 38 is supported in the sensor housing 65 so as to be fixed.

In this instance, also, the final position of the clamping ring 63 can be fixed by a securing ring 51 at the sensor housing 65. The clamping ring 63 can also be screwed into the sensor housing 65 by means of a thread. In this case, a counter-nut can be used instead of the securing ring 51.

FIG. 4 shows the basic construction of another embodiment of a tire pressure sensor 80 which is provided with the same reference numbers to the extent that it conforms to the embodiment according to FIG. 2. Thus, in FIG. 4, the reference pressure chamber 19 is fastened in the upper portion of the sensor housing 81 in the same way as in FIG. 2. However, in this instance, the additional pressure chamber 34 is not fastened at a clamping ring via the closing plate 38 as in FIG. 2; rather, it is held by a catch lock 82 which is supported in the sensor housing 81 so as to be swivelable and rests against the outer rim of the closing plate 38 by the force of a pressure spring 83 supported at the sensor housing 81. The closing plate 38 is secured against axial displacement by the catch lock 82. The catch lock 82 has a downwardly directed extension 85 arranged below its bearing 84 in a housing opening 86. By means of inserting a screw driver in this housing opening 86, the catch lock 82 can be unlocked by acting on the extension 85 so that the closing plate 38 of the additional pressure chamber 34 is axially displaceable in order to adjust a desired reference pressure in the reference pressure chamber 19.

For this purpose, an additional pressure chamber 87, which is to be filled with compressed air via an opening 88 in the form of a connection nipple which leads outward, is arranged at the back side of the closing plate 38. This additional pressure chamber 87 likewise consists of a bellows 89 which is supported at the top against the back side of the closing plate 38 and is closed at the bottom by a base plate 90 which carries the opening 88. The base plate 90 is fastened at the sensor housing 81 and is supported against it at the bottom, respectively.

If this additional pressure chamber 87 is now filled with compressed air via the opening 88, the closing plate 38 is pressed up in the axial direction of the tire pressure sensor 30 by this pressure when the catch lock 82 is unlocked. The reference volume of the pressure spaces 36 and 39 is accordingly reduced and the gas which is introduced into it prior to assembly is compressed. The desired reference pressure can be adjusted by lifting of the closing plate 38, as described in FIG. 2, in that the additional pressure chamber 87 is now filled with the same pressure. The catch lock 82 is then caught again at the rim of the closing plate 38, and the closing plate 38 is accordingly secured against axial displacement. The compressed air can now escape again from the additional pressure chamber 87 without the reference pressure being changed accordingly.

In an advantageous manner, the compressed air connection at the additional pressure chamber 87 can be constructed in such a way that it is accessible from the outside and can be filled with compressed air by means of a tire filling device. If the reference pressure no longer changes subsequently, the housing opening 86 is to be securely closed and sealed, respectively, after the calibration of the reference pressure.

Another basic possibility for solving the problem suggested by the invention is shown in FIG. 5. It shows the reference pressure chamber 19 in the area of the base opening 35. A corrugated diaphragm 91, which encloses the opening 35 and constitutes an additional pressure chamber with variable volume, is provided at the back side of the reference pressure chamber 19. The corrugated diaphragm 91 is contracted via a closing plate 94 by means of an adjusting screw 93 which can be screwed into the sensor housing 92, and the pressure in the reference pressure chamber 19 is accordingly adjusted to the desired value. The adjusting screw 93 is then advisably sealed so that the adjusted reference pressure cannot be inadvertently changed.

The solution according to the present invention is not limited to the shown embodiments since alternative design solutions are possible within the framework of the invention. However, it is essential for the adjustment of the desired reference pressure in the reference pressure chamber of the tire pressure sensor to change the reference volume filled with the gas and to fix the reference volume when the desired reference pressure is reached. This can be achieved, according to the invention by providing additional pressure chamber with variable volume, but can also be achieved by a changeable volume in the reference pressure chamber itself.

While the invention has been illustrated and described as embodied in a tire pressure sensor for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tire pressure sensor to be fastened to a rim of a vehicle wheel for sensing an inflation pressure of a tire mounted on the rim, said pressure tire sensor comprising reference pressure chamber means having a filled reference pressure volume and including a reference pressure chamber for monitoring the tire inflation pressure; an electrically conductive diaphragm sealingly separating said reference pressure chamber from a tire interior; a sensor electric circuit is said sensor; a contact pin located in said reference pressure chamber and removably contacting said electrically conductive diaphragm for closing said sensor electric circuit when the tire inflation pressure is at a predetermined value; and means defining a deformable portion of the reference pressure chamber means and enclosing at least partially said reference chamber volume, and means other than the tire pressure for deforming said deformable portion to thereby change said reference chamber volume and establish a predetermined reference pressure in said reference pressure chamber.

2. A tire pressure sensor according to claim 1, further comprising a housing; said reference pressure chamber means being located in said housing and further including an additional pressure chamber and an opening for communicating said additional pressure chamber with said reference pressure chamber, said additional pressure chamber defining said deformable portion of said reference pressure chamber means.

3. A tire pressure sensor according to claim 2, wherein said reference pressure chamber has an axis, said additional pressure chamber being arranged on an end of said reference pressure chamber opposite to said diaphragm facing end of said reference pressure chamber and including a bellows contractible in an axial direction of said reference pressure chamber.

4. A tire pressure sensor according to claim 3, wherein said reference pressure chamber means includes a plate means defining said opposite end of said reference pressure chamber, said opening being formed in said plate means, and a second plate axially displaceable relative to said plate means, said bellows extending between said plate means and said second plate.

5. A tire pressure sensor according to claim 4 further comprising a clamping ring at least partially located in said housing for axially displacing said second plate relative to said plate means.

6. A tire pressure sensor according to claim 5, wherein said reference pressure chamber is fixed in said housing, said clamping ring having an annular support for displacing said second plate axially relative to said plate means.

7. A tire pressure sensor according to claim 5, wherein said second plate is fixed in said housing, said clamping ring axially displacing said plate means relative to said second plate.

8. A tire pressure sensor according to claim 4, wherein said contact pin projects out of said reference pressure chamber means and extends beyond said second plate, said opening means comprising two openings located on opposite sides of said contact pin, said bellows means comprising two bellows surrounding said openings, respectively.

9. A tire pressure sensor according to claim 4, wherein said second plate comprises a gas filling opening, said tire pressure sensor further comprising means for gas-tight closing said filling opening.

10. A tire pressure sensor according to claim 4, wherein said second plate has a front end surface closing said additional pressure chamber and a back end surface, said reference pressure chamber means comprising a second additional chamber located on the back end surface of said second plate and having an opening for filling said second additional pressure chamber with gas, said second plate being displaceable under an action of pressure in said second additional pressure chamber.

11. A tire pressure sensor according to claim 10, further comprising an unlockable catch lock located in said housing for securing said second plate against axial displacement.

12. A tire pressure sensor according to claim 1, wherein said reference pressure chamber means comprises a corrugated diaphragm defining an additional pressure chamber and an opening for communicating said additional pressure chamber with said reference pressure chamber, said pressure sensor further comprising screw means for changing a volume of said additional pressure chamber to thereby establish a predetermined reference pressure in said reference pressure chamber.

* * * * *